United States Patent
Karlsson et al.

(10) Patent No.: US 9,391,531 B2
(45) Date of Patent: Jul. 12, 2016

(54) CONTROLLING A SWITCHED MODE POWER SUPPLY WITH MAXIMISED POWER EFFICIENCY

(75) Inventors: Magnus Karlsson, Oskarshamn (SE); Oscar Persson, Kalmar (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/375,394
(22) PCT Filed: Jan. 30, 2012
(86) PCT No.: PCT/EP2012/051429
§ 371 (c)(1), (2), (4) Date: Jul. 29, 2014
(87) PCT Pub. No.: WO2013/113354
PCT Pub. Date: Aug. 8, 2013

(65) Prior Publication Data
US 2015/0055375 A1    Feb. 26, 2015

(51) Int. Cl.
*G05F 1/00* (2006.01)
*H02M 3/335* (2006.01)
(Continued)

(52) U.S. Cl.
CPC .......... *H02M 3/33592* (2013.01); *H02M 3/156* (2013.01); *H02M 3/33507* (2013.01); *H02M 2001/0003* (2013.01); *H02M 2001/0022* (2013.01); *H02M 2001/0025* (2013.01)

(58) Field of Classification Search
CPC .............. H02M 3/335; H02M 3/3353; H02M 3/33538; H02M 3/33592; H02M 3/33507; H02M 3/33546; H02M 3/337; H02M 3/338; H02M 3/156; H02M 3/155; H02M 3/1566; H02M 3/158; H02M 3/157; H02M 2001/0003; H02M 2001/0022; H02M 2001/0025; H02M 2001/0016; H02M 2001/0009; H02M 1/36; H02M 7/125; G05F 1/468

USPC ......... 323/222–226, 238, 271–276, 280–288, 323/299–303, 321, 351, 901, 311–313; 363/15–26, 21.04–21.18, 49, 40, 41, 363/74, 79, 89, 95, 97, 98, 123–127, 363/131–134
See application file for complete search history.

(56) References Cited

U.S. PATENT DOCUMENTS 6,538,417 B2 *  3/2003  Marty et al. .................. 323/282
7,269,034 B2    9/2007  Schlecht
(Continued)

OTHER PUBLICATIONS

International Search Report and Written Opinion, Application No. PCT/EP2012/051429, Nov. 2, 2012, 12 pages.
(Continued)

*Primary Examiner* — Timothy J Dole
*Assistant Examiner* — Carlos Rivera-Perez
(74) *Attorney, Agent, or Firm* — NDWE LLP

(57) ABSTRACT

A control circuit, that controls the duty cycle of a switched mode power supply, comprises a reference voltage generator that, responsive to the input voltage exceeding a threshold value, generates a predetermined reference signal. Responsive to the input voltage not exceeding the threshold value, the reference voltage generator receives a signal indicative of an input voltage of the switched mode power supply and generates a variable reference signal dependent upon the input voltage. The control circuit further comprises an error signal generator that receives a signal indicative of an output voltage of the power supply and generates an error signal based on the reference signal generated by the reference voltage generator and based on the output voltage. The control circuit also includes a duty cycle control signal generator that generates the control signal to control the duty cycle of the power supply in dependence upon the error signal.

19 Claims, 18 Drawing Sheets

(51) Int. Cl.
*H02M 3/156* (2006.01)
*H02M 1/00* (2006.01)

(56) References Cited

U.S. PATENT DOCUMENTS

| | | | |
|---|---|---|---|
| 7,272,021 B2 | 9/2007 | Schlecht et al. | |
| 7,558,083 B2 | 7/2009 | Schlecht | |
| 7,564,702 B2 | 7/2009 | Schlecht | |
| 7,787,261 B2 | 8/2010 | Farrington et al. | |
| 2010/0225293 A1* | 9/2010 | Wang et al. | 323/290 |
| 2010/0231183 A1 | 9/2010 | Jan et al. | |
| 2011/0026275 A1* | 2/2011 | Huang et al. | 363/21.02 |

OTHER PUBLICATIONS

Barry, M., "Design Issues in Regulated and Unregulated Intermediate Bus Converters," 2004 IEEE, Applied Power Electronics Conference and Exposition, APEC 04, IEEE, Anaheim, CA, USA, vol. 3, Feb. 22, 2004, pp. 1389-1394.

International Preliminary Report on Patentability, Application No. PCT/EP2012/051429. dated Aug. 14, 2014, 8 pages.

* cited by examiner

US 9,391,531 B2

CONTROLLING A SWITCHED MODE POWER SUPPLY WITH MAXIMISED POWER EFFICIENCY

CROSS-REFERENCE TO RELATED APPLICATIONS

This application is a National stage of International Application No. PCT/EP2012/051429, filed Jan. 30, 2012, which is hereby incorporated by reference.

TECHNICAL FIELD

The present invention generally relates to the field of switched mode power supplies (sometimes referred to as switch mode power supplies or switching mode power supplies) and more specifically to the control of the duty cycle of a switched mode power supply.

BACKGROUND

The switched mode power supply (SMPS) is a well-known type of power converter having a diverse range of applications by virtue of its small size and weight and high efficiency. For example, SMPSs are widely used in personal computers and portable electronic devices such as cell phones. An SMPS achieves these advantages by switching a switching element such as a power MOSFET at a high frequency (usually tens to hundreds of kHz), with the frequency or duty cycle of the switching defining the efficiency with which an input voltage is converted to a desired output voltage.

In most SMPS topologies, the output voltage, $V_{out}$, is directly proportional to the input voltage, $V_{in}$:

$$V_{out} \propto nDV_{in} \qquad \text{Equation 1}$$

In Equation 1 above, P is the duty cycle of the switching, and $n = n_s/n_p$ is the transformer ratio (the number of turns on the secondary side, $n_s$, divided by the number of turns on the primary side, $n_p$) if a transformer is used in the SMPS or n=1 if no transformer is used. The duty cycle is critical to achieving high converter efficiency, and a duty cycle of 100% will generally yield the maximum efficiency.

A number of different control strategies for controlling the duty cycle of an SMPS are known.

One method of control is used in fixed ratio converters or Intermediate Bus Converters (IBCs), which are also referred to as unregulated converters. These lack all control of the output voltage but run with a maximised duty cycle. This yields maximised power efficiency since the converter transfers energy almost 100% of the time, with the exception of the dead time needed during switching. With this strategy, the output voltage varies with the input voltage according to Equation 1 above. Unregulated converters with different topologies are disclosed in U.S. Pat. No. 7,272,021, U.S. Pat. No. 7,558,083, U.S. Pat. No. 7,564,702 and U.S. Pat. No. 7,269,034, for example. Furthermore, narrow regulation of the voltage can be taken care of by second layer SMPSs called Point of Load (POL) regulators, this power architecture being referred to as Intermediate Bus Architecture (IBA), for example as disclosed in U.S. Pat. No. 7,787,261.

Semi-regulated converters compensate for a varying input voltage (line regulation) at the expense of a varying duty cycle, which reduces power efficiency. An example of such a converter is disclosed in U.S. Pat. No. 7,787,261. The converter load can affect the output voltage, causing it to decrease with increasing load, a phenomenon known as droop. Since the output of an SMPS has an LC filter then load transients cause the output voltage to oscillate, and only inherent parasitic resistances dampen the oscillations.

Quasi-regulated bus converters, for example as disclosed in U.S. Pat. No. 7,787,261, are line regulated in only a part of the input voltage range, while in other parts of the input voltage range they are unregulated using 100% duty cycle to maximise efficiency. This yields an increased input voltage range without increasing the output voltage range.

Output regulated converters compensate for varying load conditions and input voltage changes by feedback of the output voltage. Voltage feed forward is often added in order reduce output voltage disturbances due to input voltage transients. This type of regulation offers the most stable output voltage at the cost of lower efficiency.

Irrespective of the control strategy, it is preferable for the output voltage of an SMPS to remain at its desired level under all conditions. However, transients and changes of the input voltage will cause the output voltage to change almost immediately. This can introduce large changes in the output voltage of the SMPS. Typically, only the inertia in an output filter of the SMPS will decrease this effect.

All the above-described control strategies have drawbacks in terms of output voltage tolerance, transient responses and power efficiency. Furthermore, many of these variables are dependent and optimising one makes the others worse.

SUMMARY

In view of the problems in known SMPS control strategies, the present invention aims to provide an apparatus and method for generating a control signal to control the duty cycle of an SMPS in such a way that a high power efficiency is maintained, whilst improving the output voltage response to transients as compared to known strategies.

In general terms, the invention introduces two types of load regulation into a fixed ratio converter which can be selected based on input voltage level, and maximises efficiency at the same time. An embodiment improves the damping of the oscillations on the output voltage due to input voltage transients, while maintaining the duty cycle near to 100%.

More specifically, the present invention provides a control circuit operable to generate a control signal to control the duty cycle of a switched mode power supply. The control circuit comprises a reference voltage generator operable in a first mode to generate a predetermined reference signal and operable in a second mode to receive a signal indicative of an input voltage of the switched mode power supply and generate a variable reference signal dependent upon the input voltage. The reference voltage generator is configured to operate in the first mode when the input voltage exceeds a threshold value, and to operate in the second mode when the input voltage is equal to or smaller than said threshold value. The control circuit further comprises an error signal generator operable to receive a signal indicative of an output voltage of the switched mode power supply and operable to generate an error signal based on the reference signal generated by the reference voltage generator and based on the output voltage. The control circuit also includes a duty cycle control signal generator operable to generate the control signal to control the duty cycle of the switched mode power supply in dependence upon the error signal.

The present invention further provides a control method of generating a control signal to control the duty cycle of a switched mode power supply. The method comprises receiving a signal indicative of an input voltage of the switched mode power supply as well as a signal indicative of an output voltage of the switched mode power supply. A reference voltage generator operates in a first mode to generate a predetermined reference signal when the input voltage exceeds a threshold value, and in a second mode to generate a variable reference signal dependent upon the input voltage when the input voltage is equal to or smaller than said threshold value. An error signal is generated which is based on both the reference signal generated by the reference voltage generator and the output voltage. The method further comprises generating a control signal to control the duty cycle of the switched mode power supply in dependence upon the error signal.

These features provide a number of advantages. For example, varying the duty cycle in dependence upon both the input voltage of the SMPS and the output voltage of the SMPS in the second mode of operation of the reference voltage generator allows more accurate control of the duty cycle to maintain maximal power efficiency whilst compensating for voltage transients. Furthermore, as will be explained in the following, the ability of the reference voltage generator to switch between operating in one of the aforementioned first and second modes to the other mode when the SMPS input voltage increases beyond, or decreases to or below, the threshold value allows for a larger transformer ratio to be used in the SMPS, thereby further improving its efficiency as well as the output power it can deliver.

BRIEF DESCRIPTION OF THE DRAWINGS

Embodiments of the invention will now be described, by way of example only, with reference to the accompanying drawings in which.

DETAILED DESCRIPTION OF EMBODIMENTS

As will be explained in detail below, the present invention proposes a control strategy for a switched mode power supply. The control strategy maintains high power efficiency and still improves the output voltage response when faced with input voltage transients or load current transients at the output.

Figure 1:
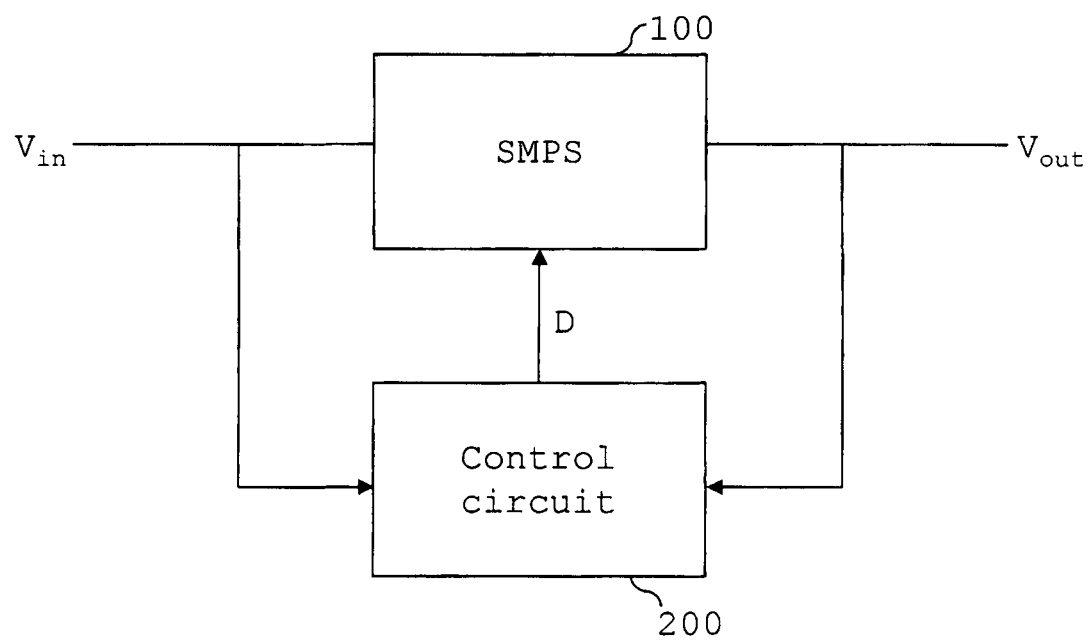
FIG. 1 is a block diagram of a switched mode power supply and a control circuit according to a first embodiment of the present invention for generating a control signal for controlling the switched mode power supply.

FIG. 1 depicts a top-level block diagram of a switched mode power supply (SMPS) 100 and control circuit 200. The control circuit 200 is arranged to receive signals indicative of the input voltage $V_{in}$ and the output voltage $V_{out}$ of the SMPS 100. These signals may comprise analogue signals of the voltages themselves or digital signals containing information defining voltage values measured by measurement equipment (not shown). Based on the signals indicative of the SMPS output voltage, or both the signals indicative of the SMPS input voltage and the signals indicative of the output SMPS voltage (depending on the mode of operation discussed further below), the control circuit 200 is operable to generate a control signal D to control the duty cycle of the switched mode power supply 100. It will be appreciated that the control circuit 200 can be made and sold separately from the SMPS 100.

Figure 2:
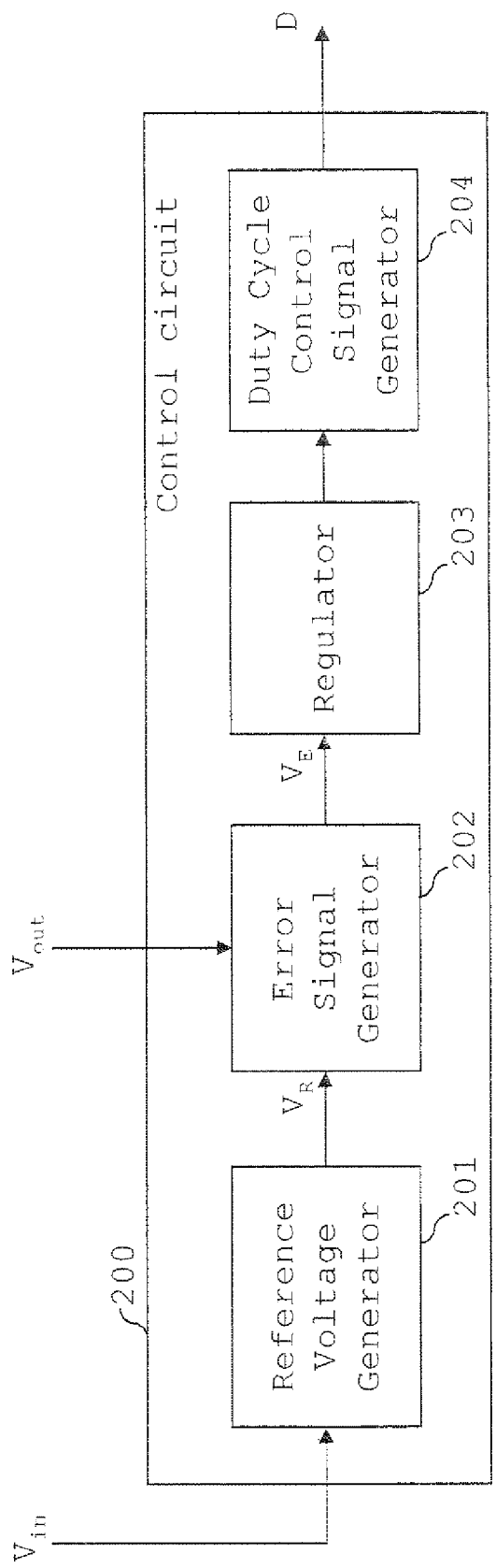
FIG. 2 is a block diagram showing further detail of the control circuit according to the first embodiment of the present invention.

FIG. 2 is a schematic block diagram of the control circuit 200. The control circuit 200 comprises a reference voltage generator 201, an error signal generator 202, optionally a regulator 203, and a duty cycle control signal generator 204.

The reference voltage generator 201 is operable in a first mode (also referred to herein as the "Fully Regulated" mode) to generate a predetermined reference signal $V_{Rdes}$ which is set to a desired level. The size of $V_{Rdes}$ may be set to a fixed value or may be made adjustable by the SMPS operator using well-known techniques. Accordingly, during operation, $V_{Rdes}$ remains constant unless changed by the operator.

In a second mode of operation (also referred to herein as the "Regulated Ratio" mode), reference voltage generator 201 is operable to receive a signal indicative of an input voltage $V_{in}$ of the switched mode power supply 100 and operable to generate a variable reference voltage $V_{Rvar}$ which is dependent upon the input voltage $V_{in}$.

As will be explained in the following, the reference voltage generator 201 is configured to operate in the first mode when the input voltage $V_{in}$ exceeds a threshold value, and to operate in the second mode when the input voltage $V_{in}$ is equal to or smaller than the threshold value.

The error signal generator 202 is arranged to receive a signal indicative of the output voltage $V_{out}$ of the SMPS 100, as well as the reference signal $V_R$ generated by the reference voltage generator 201, (i.e. either $V_{Rdes}$ or $V_{Rvar}$ depending on the mode of operation of the reference voltage generator 201). The error signal generator 202 is operable to generate an error signal $V_E$ based on the reference signal $V_R$ and based on the output voltage $V_{out}$.

For comparison, in a known fully-regulated converter, which can only use a fully-regulated control strategy, the control circuit measures the output voltage $V_{out}$ of the switched mode power supply 100, and this is then compared with a constant reference signal equal to the desired output voltage or directly proportional to the desired output voltage, with no provision for switching to a mode of operation which employs a variable reference voltage that is dependent upon the input voltage of the SMPS. In contrast, as explained herein, in embodiments of the present invention the reference signal $V_R$ is constant in a first operational mode of the reference voltage generator 201, and is directly proportional to the input voltage of the SMPS 100 in a second operational mode of the reference voltage generator 201.

The error signal V, is then fed into an optional regulator 203 or, if the regulator 203 is not provided, the error signal $V_E$ is fed into the duty cycle control signal generator 204. The regulator 203 is operable to generate a signal defining a duty cycle ratio in dependence upon the error signal $V_E$.

The duty cycle control signal generator 204 is arranged to receive the output of the regulator 203 (or the error signal $V_E$ if the regulator is not provided) and is operable to generate the required control signal D to control the duty cycle of the switched mode power supply 100.

Figure 3:
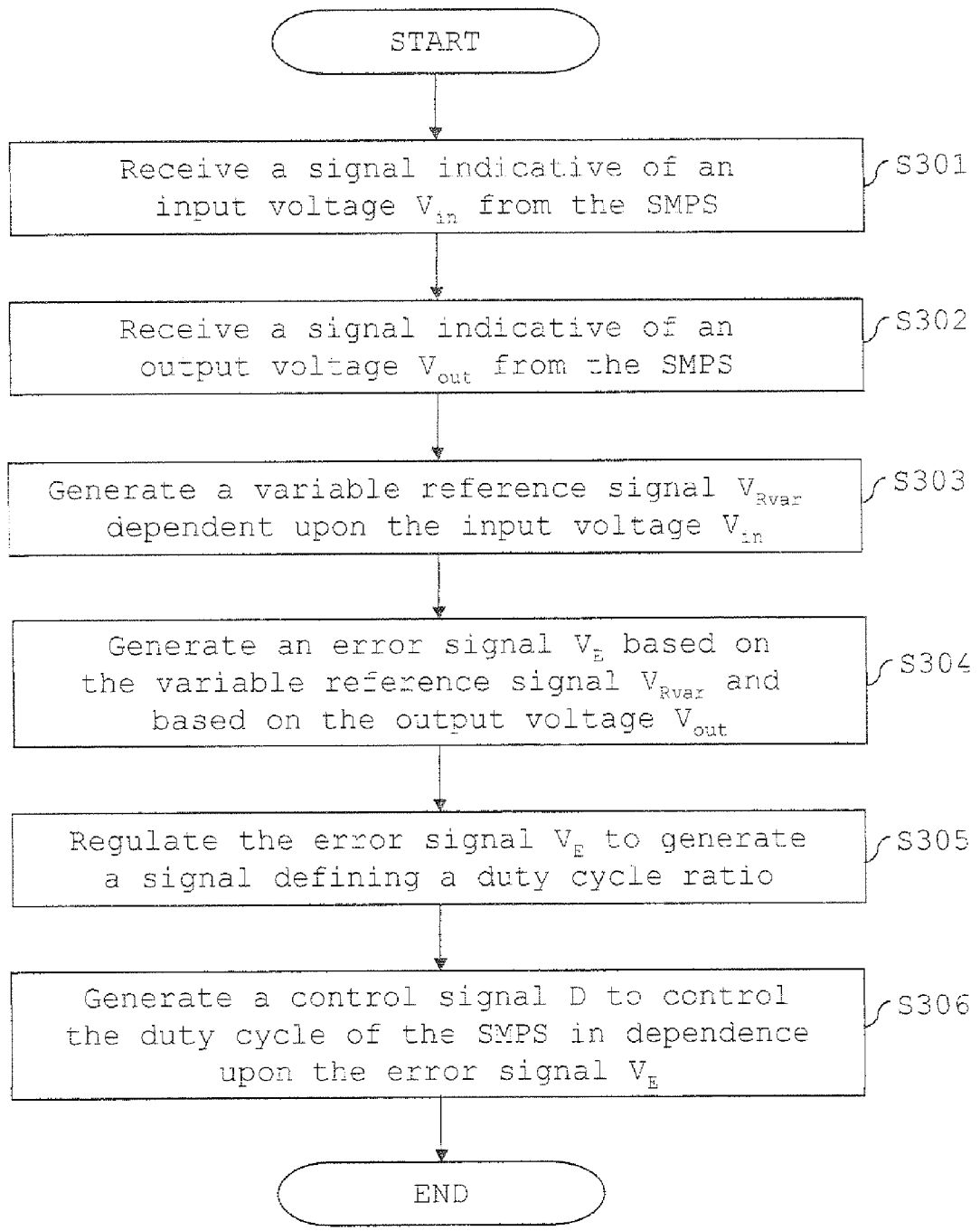
FIG. 3 is a flowchart showing the processes performed by the components of FIG. 2 when the reference voltage generator operates in the second mode of operation described herein.

FIG. 3 shows a flowchart of the processing operations performed by the control circuit 200 of FIG. 2 for generating a control signal D to control the duty cycle of the SMPS 100 when the reference voltage generator operates in the second mode of operation. The conventional processing operations undertaken when the reference voltage generator operates in the first mode of operation (i.e. Fully Regulated) are well known and will not be described here for sake of brevity.

Referring to FIG. 3, in step S301, the reference voltage generator 201 receives a signal indicative of an input voltage $V_{in}$ from the SMPS 100. The received signal may be an analogue representation of the input voltage of the SMPS 100 or it may be a digital representation.

At step S302, the error signal generator 202 receives a signal indicative of the output voltage $V_{out}$ of the SMPS 100.

At step S303, the reference voltage generator 201 generates a variable reference signal $V_{Rvar}$ that is dependent upon the input voltage $V_{in}$.

At step S304, the error signal generator 202 generates an error signal $V_E$ based on both the variable reference signal $V_{Rvar}$ and the output voltage $V_{out}$.

Optionally, the process may then proceed with step S305, at which the regulator 203 regulates the error signal $V_E$ to generate a signal defining a duty cycle ratio.

At step S306, a control signal D is generated to control the duty cycle of the SMPS 100. The generated control signal D is dependent upon the error signal $V_E$, and, if the regulation step of S305 is performed, then the control signal D is generated in dependence upon the signal defining a duty cycle ratio.

Figure 4:
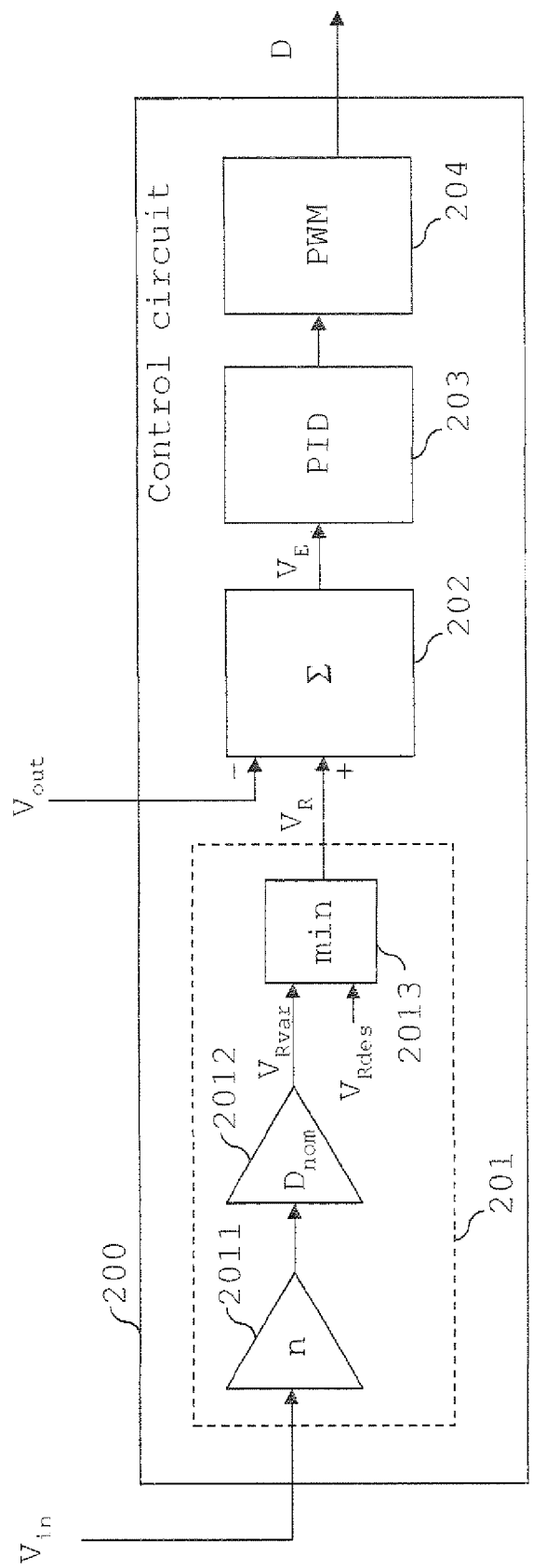
FIG. 4 is a block diagram showing yet further detail of the control circuit according to the first embodiment of the present invention.

Further details of the operation of the control circuit 200 will now be described with reference to a specific embodiment as shown in FIG. 4. FIG. 4 illustrates an exemplary configuration of the reference voltage generator 201 that enables it to switch between its first and second operational modes, as well as exemplary implementations of the error signal generator 202, regulator 203 and duty cycle control signal generator 204.

As shown in FIG. 4, the reference voltage generator 201 comprises a transformer turns ratio multiplier 2011, a nominal duty cycle multiplier 2012 and a reference signal selector 2013. It should be noted that, if the SMPS 100 does not have a transformer, then the transformer turns ratio multiplier 2011 is omitted.

The transformer turns ratio multiplier 2011 is operable to multiply the received signal indicative of the input voltage $V_{in}$ of the SMPS 100 by a transformer turns ratio n, where $n=n_s/n_p$ and $n_s$ is the number of turns on the secondary side winding of the transformer, $n_p$ is the number of turns on the primary side winding of the transformer.

The nominal duty cycle multiplier 2012 is operable to multiply the output of the transformer turns ratio multiplier 2011 by a nominal duty cycle ratio $D_{nom}$, which is discussed in further detail later.

Therefore, the variable reference signal $V_{Rvar}$ is generated by multiplying the input voltage $V_{in}$ of the switched mode power supply 100 by the transformer turns ratio n and a nominal duty cycle $D_{nom}$, in accordance with the following equation.

$$V_{Rvar}=nD_{nom}V_{in} \qquad \text{Equation 2}$$

As explained below, with this variable reference signal $V_{Rvar}$, the duty cycle of the SMPS 100 will be controlled to be almost constant and close to $D_{nom}$ when the reference voltage generator 201 operates in the Regulated Ratio (i.e. second) mode of operation.

In the present embodiment, the switching between the first and second modes of operation of the reference voltage generator 210 is controlled by the reference signal selector 2013. More specifically, as shown in FIG. 4, the reference signal selector 2013 is operable to receive the predetermined reference signal $V_{vdes}$ from e.g. a precision reference, and the variable reference signal $V_{Rvar}$ from the nominal duty cycle multiplier 2012, and then select, as the reference signal $V_R$ to be provided to the error signal generator 202, the smaller of these received signals according to the following equation:

$$V_R=\min\{nD_{nom}V_{in}, V_{des}\} \qquad \text{Equation 3}$$

Figure 5:
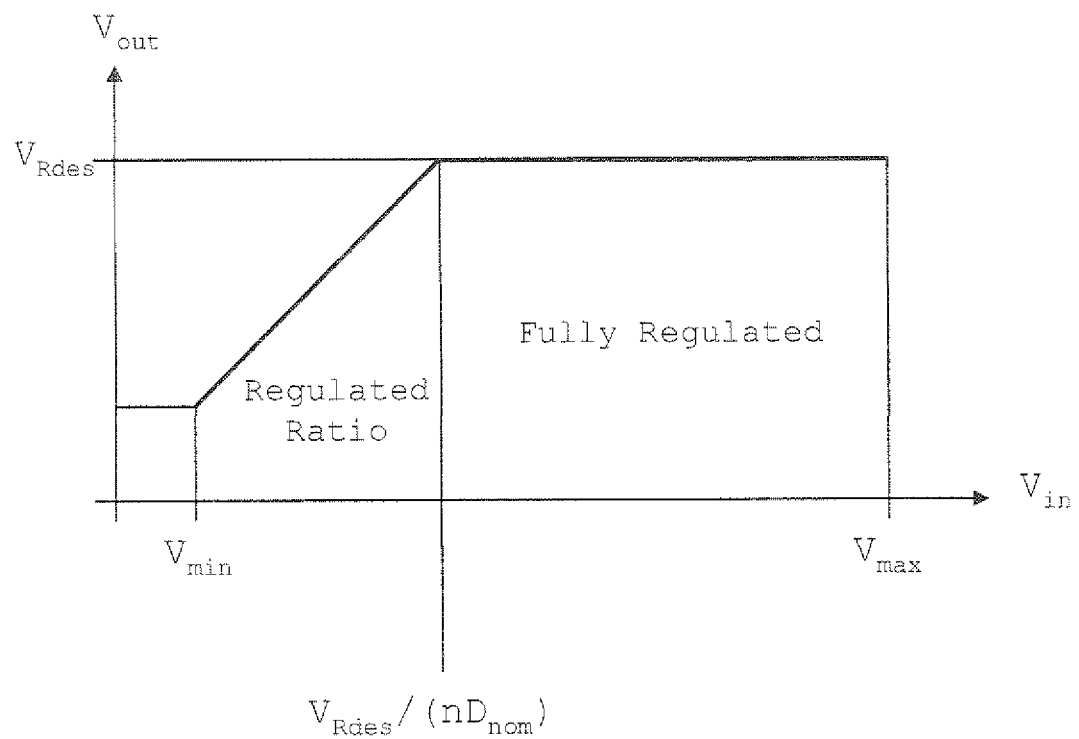
FIG. 5 illustrates the variation of the SMPS output voltage as a function of the input voltage.

In Equation 3, "min" denotes the minimum function which selects the minimum value of the operands. The output voltage $V_{out}$ as a function of the input voltage $V_{in}$ is illustrated in FIG. 5

Referring again to FIG. 4, the error signal generator 202 in this embodiment comprises a difference calculator, which compares the generated reference signal $V_R$ with a signal indicative of the output voltage $V_{out}$ of the SMPS 100. To achieve this, in this embodiment, the difference is found between the output voltage $V_{out}$ and the reference signal $V_R$ to generate the error signal $V_E$, as given by the following equation:

$$V_E = (nD_{nom}V_{in}) - V_{out} \qquad \text{Equation 4}$$

The error signal is then fed into a regulator in the form of PID regulator 203. The output of the PID regulator 203 is in a steady state and is the duty cycle required to obtain the required $V_{out}$ that is independent of the load current, namely:

$$V_{out} = nD_{nom}V_{in} \qquad \text{Equation 5}$$

The output of the PIT regulator 203 is then fed into a duty cycle control signal generator 204 which comprises a pulse width modulating (PWM) circuit that translates the duty cycle ratio (from the PID regulator 203) into a pulse width modulated signal D that controls the switching elements in the SMPS 100.

Figure 6:
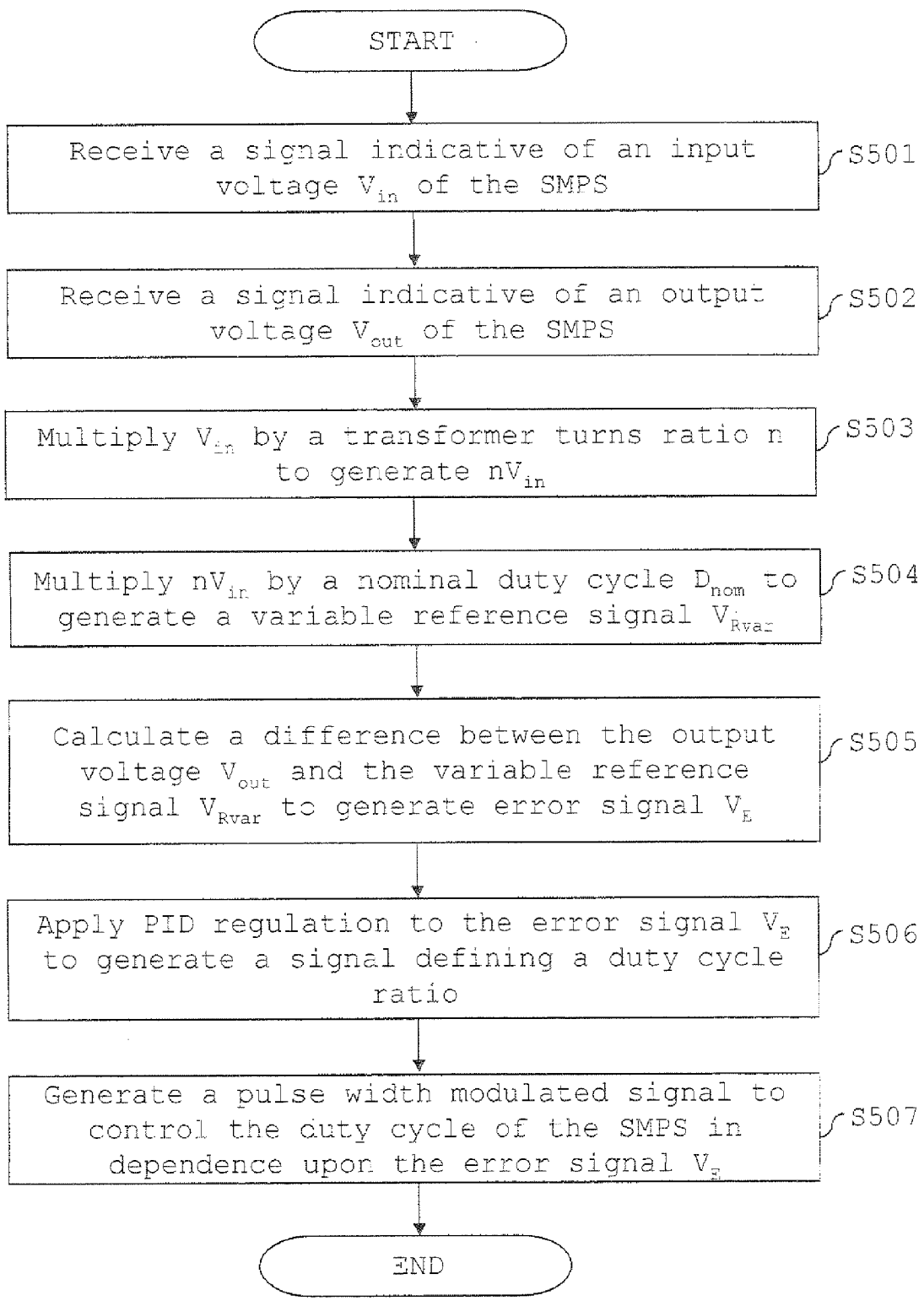
FIG. 6 a flowchart showing the processes performed by the components of FIG. 4.

FIG. 6 shows a flowchart of the processing operations performed by the control circuit 200 of FIG. 4 for generating a control signal D to control the duty cycle of a switched mode power supply 100 when the reference voltage generator operates 201 in its second mode of operation; that is, for values of $V_{in} < V_{Rdes}/nD_{nom}$, as illustrated in FIG. 5.

Referring to FIG. 6, at step S501, the reference voltage generator 201 receives a signal indicative of an input voltage $V_{in}$ from the SMPS 100. The received signal may be an analogue representation of the input voltage $V_{in}$ of the SMPS 100 or it may be a digital representation.

At step S502, the error signal generator 202 receives a signal indicative of the output voltage $V_{out}$ of the SMPS 100.

At step S503, the transformer turns ratio multiplier 2011 multiplies the signal indicative of the input voltage $V_{in}$ by the transformer turns ratio n, thereby generating a signal of size $nV_{in}$. However, if a transformer is not included in the SMPS this step may be omitted or the input voltage $V_{in}$ may be multiplied by 1.

At step S504, the nominal duty cycle multiplier 2012 multiplies the signal $nV_{in}$ by a nominal duty cycle $D_{nom}$ to generate the variable reference signal $V_{Rvar}$. Since the variable reference signal $V_{Rvar}$ is smaller than the predetermined reference signal $V_{Rdes}$ in this example, the reference signal selector 2013 selects the variable reference signal $V_{Rvar}$ rather than the predetermined reference signal $V_{Rdes}$ and outputs the selected signal $V_{Rvar}$ to the difference calculator 202 as the reference signal $V_E$.

At step S505, the difference calculator 202 calculates a difference between the signal indicative of the output voltage $V_{out}$ of the SMPS 100 and the reference signal $V_R$ in order to generate an error signal $V_E$.

Optionally, the process may then proceed with step S506, at which the PID regulator 203 applies PID regulation to the error signal $V_E$ in order to generate a signal defining a duty cycle ratio.

At step S507, the pulse width modulator 204 generates a pulse width modulated signal to control the duty cycle of the SMPS 100 in dependence upon the error signal $V_E$. However, if the regulation step of S506 is performed then the pulse width modulated signal is generated in dependence upon the signal defining a duty cycle ratio.

In summary, it will be understood from the description of the first embodiment above that the control circuit 200 introduces load regulation into an otherwise fixed ratio converter. Instead of using a fixed duty cycle, the duty cycle can be varied according to the load requirements and according to the input voltage $V_{in}$ of the IMPS 100. This is achieved using both the input voltage $V_{in}$ and the output voltage $V_{out}$ to generate the duty cycle control signal D when the reference voltage generator 201 is operating in the above-described second mode of operation. This improves the damping of oscillations on the output due to input voltage transients, while maintaining the duty cycle near to 100%, for maximum efficiency.

There are also significant advantages associated with the capability of the reference voltage generator 201 to switch from operating in one of the two above-described operational modes to the other mode, depending on the prevailing SMPS input voltage level.

Figure 7:
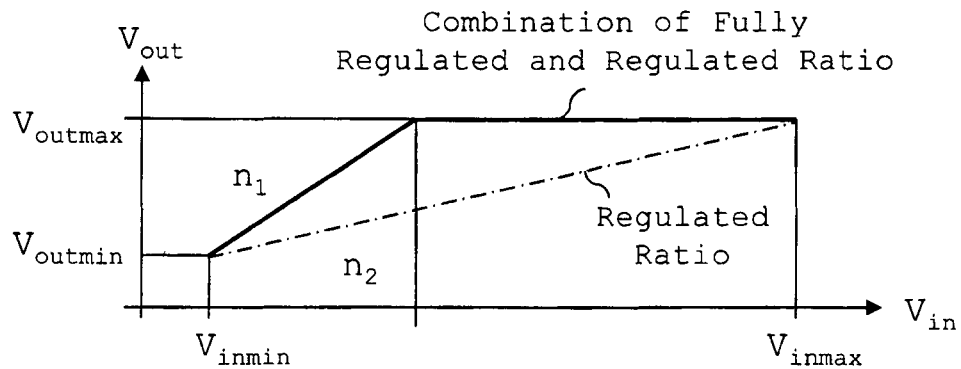
FIG. 7 another schematic illustrating the variation of the SMPS output voltage as a function of the input voltage, which shows how the ability of the reference voltage generator to switch between the first and second operational modes allows a higher transformer ratio to be used in the SMPS.
Figure 8:
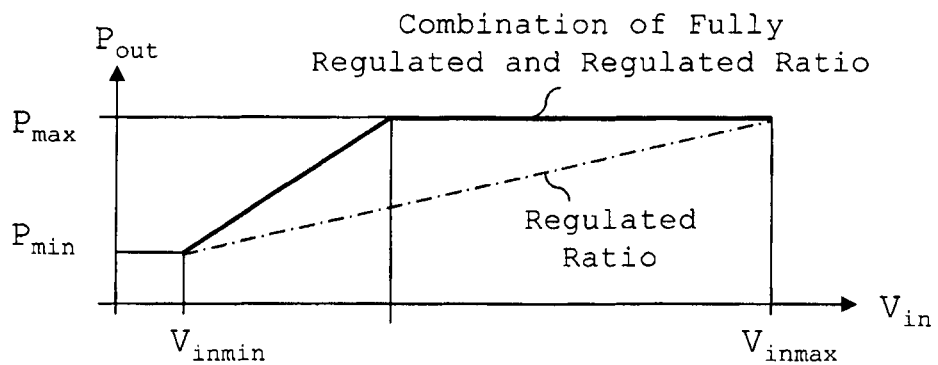
FIG. 8 is a schematic illustrating how the power output of the SMPS varies with input voltage, and shows how the ability of the reference voltage generator to switch between the first and second operational modes increases the power output of the SMPS.

For example, as can be appreciated from the variation of the SMPS output voltage $V_{out}$ with the input voltage $V_{in}$ shown schematically in FIG. 7, using the above-described combination of the Fully Regulated and the Regulated Ratio modes of operation (i.e. the combination of the above-described first and second modes) allows for a higher transformer turns ratio to be used in the SMPS 100 as compared to the case where the reference voltage regulator 201 is configured to operate in the Regulated Ratio mode only. As shown in FIG. 7, turns ratio $n_1$ required for the combination is greater than the turns ratio $n_2$ required when operation is limited to the Regulated Ratio mode.

Furthermore, as illustrated in FIG. 6, where the control strategy employs the above-described combination of the Fully Regulated and the Regulated Ratio operational modes, the output voltage $V_{out}$ is larger in the whole working region, which allows the output power $P_{out}$ to be increased without increasing the output current that is the limiting factor in the design.

Figure 9:
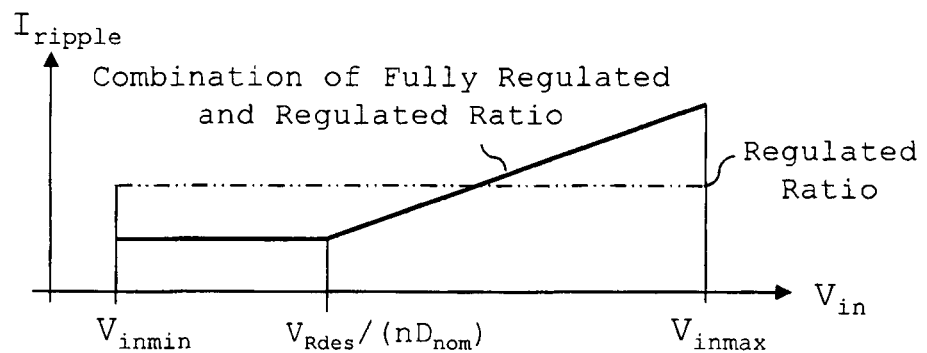
FIG. 9 is a schematic illustrating how the ripple current in the output choke of the SMPS varies with input voltage.

FIG. 9 is a schematic illustrating the variation of the SMPS output current ripple $I_{ripple}$ with the input voltage $V_{in}$. Where the reference voltage generator 201 operates in the Regulated. Ratio mode, the output current ripple $I_{ripple}$ is constant and independent of the input voltage $V_{in}$, in contrast with the Fully Regulated part of the combination control strategy, where the current ripple $I_{ripple}$ increases with input voltage $V_{in}$. This implies that the pure Regulated Ratio can use a smaller inductor for a given ripple requirement than the combination control strategy. However, a larger inductor is preferable in terms of active current sharing.

In order to maintain good load regulation and transient response a design margin for the nominal duty cycle $D_{nom}$ has to be introduced. Simulations and measurements performed by the present inventors show that a margin of a few percent is enough, yielding e.g. $D_{nom} \approx 97\%$. Hence, the power efficiency of an embodiment is almost at maximum and not reduced much compared with a fixed radio converter, but the embodiment provides improved transient response and load regulation.

It should be noted that, because the duty cycle of an embodiment is controlled near the natural border of 100%, methods should be employed to avoid integral wind-up. For example, well-known saturation circuitry of the integral value can be used to solve this issue.

Figure 10:
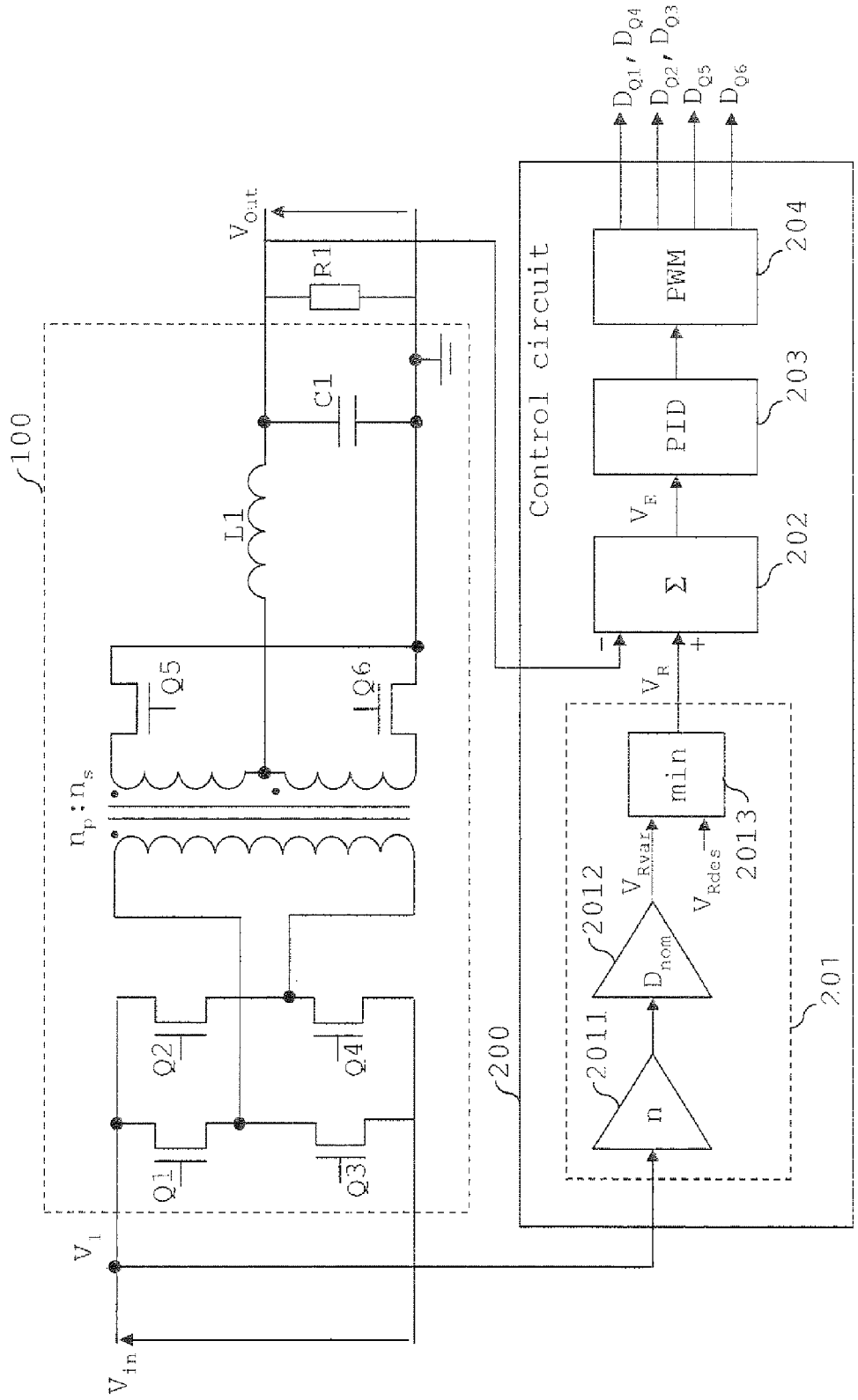
FIG. 10 is a circuit diagram showing the interconnection of the control circuit of the first embodiment with an SMPS, so that the control circuit can control the duty cycle of the SMPS.

FIG. 10 depicts the integration of an SMPS 100 with the control circuit. 200 of an embodiment. In this figure, a typical SMPS 100 is shown. Operation of this SMPS 100 is achieved through control of six transistors, Q1 to Q6. Running this SMPS with a maximised duty cycle of 100% will result in maximised power efficiency. This circuit is directed to a DC-DC converter, using a transformer T1. An H-bridge is provided to generate an AC signal, formed from switching elements Q1-Q4. Specifically, Q1 and Q4 will initially be switched on and Q2 and Q3 switched off. This generates a positive-swinging signal across the transformer's primary coil thereby resulting is a change in flux. As a result, a voltage is induced across the transformer's secondary coil. Q6 can then be switched on, and Q5 switched off to provide rectification of the signal. Similarly, the same is performed inversely to generate a negative-swinging signal, by turning Q1, Q4 and Q6 off and turning Q2, Q3 and Q5 on to capture energy from the negative portion of the cycle.

As shown in FIG. 10, and as described above with reference to previous figures, the control circuit 200 has inputs indicative of the input voltage $V_{in}$ and output voltage $V_{out}$ of the SMPS 100. Based on these inputs, the control circuit 200 generates various duty cycle control signals D for controlling the various switching elements of the switched mode power supply 100, as described below. In this case the ground reference is at the secondary side.

Figure 11:
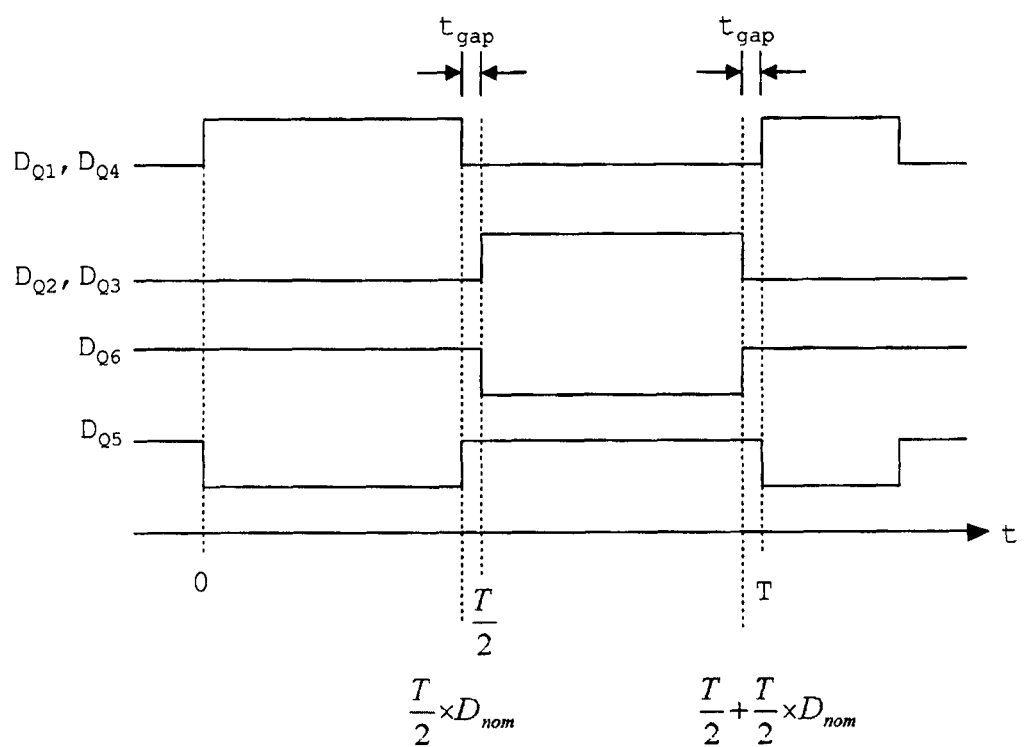
FIG. 11 is a timing diagram showing control signals, produced the control circuit of FIG. 10, for switching elements in the SMPS.

FIG. 11 depicts an exemplary timing diagram for the various control signals as output from the control circuit 200 to control the duty cycle of the SMPS 100. The control signals relate to the switching elements of the SMPS 100, as depicted in FIG. 6.

As shown in FIG. 11, the control signals for Q1 and Q4 (labelled $D_{Q1}$ and $D_{Q4}$) closely match the inverse of the control signals for Q2 and Q3 (labelled $D_{Q2}$ and $D_{Q3}$). This generates alternate positive and negative voltage cycles on the primary side of the transformer T1. This induces a changing flux in the transformer T1 and thereby induces a voltage across the secondary side of the transformer T1.

The small timing gap $t_{gap}$ between the end the control signal for Q1 and Q4 and the start of the control signal for Q2 and Q3 is due to $D_{nom}$ not being exactly 100% but instead being around 97% in the present embodiment. As a result, the length of the 'on-time' for Q1 and Q4 is substantially T/2× $D_{nom}$, where T is the length of a cycle. Similarly the 'on-time' for Q2 and Q3 is also substantially T/2×$D_{nom}$. The control circuit 200 controls the 'on-time' to maintain good load regulation and transient response by controlling the size of the timing gap $t_{gap}$.

FIG. 11 also shows typical control signals for Q5 and Q6 (labelled $D_{Q5}$ and $D_{Q6}$). As shown, at the end of the first half 'on period' for Q1 and Q4, Q5 is switched on whilst Q6 is on. This generates a conductive path to allow the discharging of inductor L1 into capacitor C1 and the load R. After this, Q6 is switched off and Q5 is left on to perform rectification of the signal from the secondary side of the transformer T1.

[Experimental Results]

The inventors have performed simulation experiments to compare the performance of an SMPS 100 controlled using a control circuit 200 according to an embodiment of the present invention with an unregulated SMPS, to show the improvement, as made by embodiments of the present invention, in terms of input voltage transient and load transient behavior.

Figure 12:
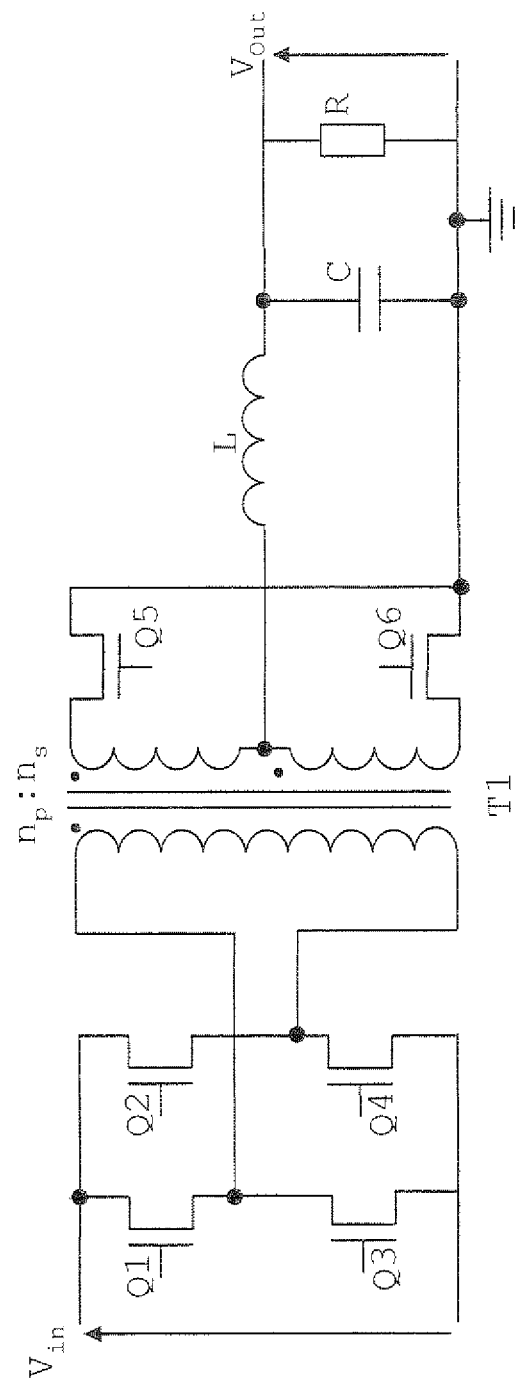
FIG. 12 shows a known DC-DC SMPS which was used in a test comparison against the embodiment of the present invention shown in FIG. 10.

More particularly, the inventors compared the performance of the SMPS 100 and control circuit 200 shown in FIG. 10 and detailed above with the SMPS 100 shown in FIG. 12. The SMPS 100 shown in FIG. 12 is the same as the SMPS 100 shown in FIG. 10, but it is operated in an unregulated mode and therefore does not benefit from the control of the control circuit 200 of embodiments of the present invention.

In the experiments, the SMPS 100 had an input voltage range of 38-55 V and a transformer ratio of 4:1, yielding an ideal output voltage range of 9.5-13.75 V. The maximum output load current was 33 A.

FIGS. 13 to 18 show the results of the experiments. In all these experiments, the reference voltage generator 201 of the embodiment was restricted to operate only in the Regulated Ratio mode of operation (i.e. the second mode described above).

Figure 13:
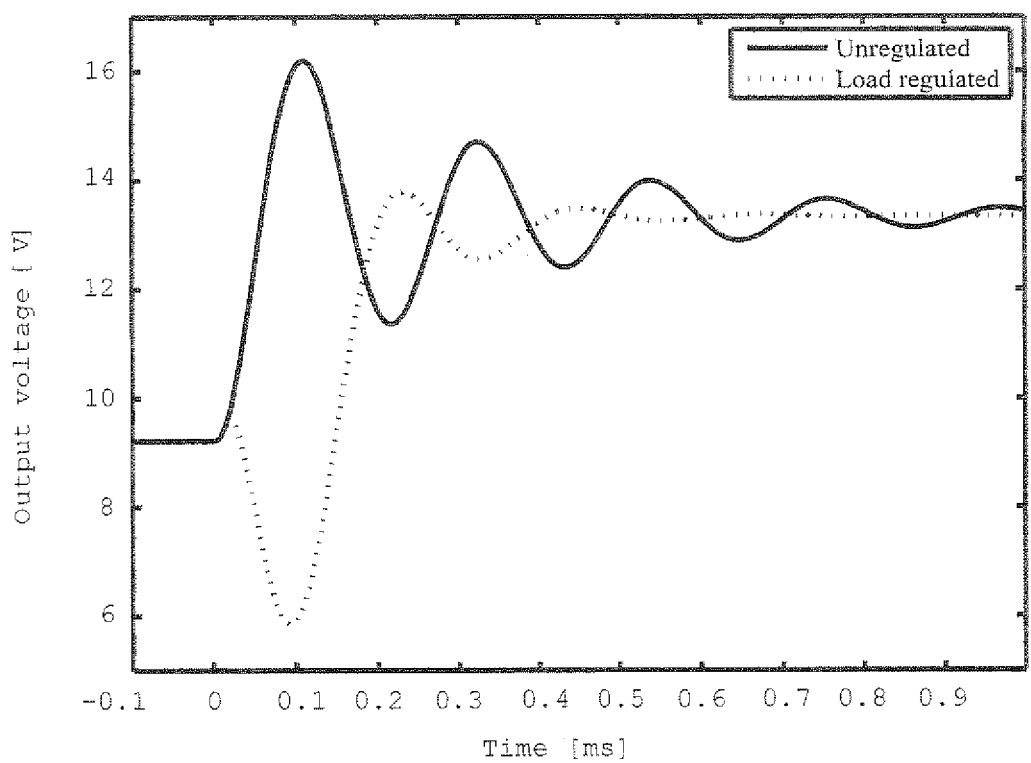
FIG. 13 shows experimental results from the test comparison comparing the performance of the embodiment of the present invention with the known unregulated converter for the case of an input voltage step from 38 V to 55 V with a load current of 0 A.

In FIG. 13, the input voltage transients of the fixed ratio (4:1) unregulated converter, and the load regulated converter controlled in accordance with the control circuit 200 according to an embodiment of the present invention, when operating in the Regulated Ratio mode, are shown for a scenario in which the input voltage step raises from 38 V to 55 V with a rise time of 100 microseconds and with a load current of 0 A.

The unregulated converter shows a rapid output voltage increase with a large overshoot and large ringing with less damping compared with the load regulated converter.

The inventors have found that the voltage dip in the regulated converter is due to a delay in the measurement of the input voltage, and have further found that reducing this delay will reduce this dip.

The inventors have also found that another solution to prevent the initial dip in output voltage of the load regulated converter is to perform control using the control circuit 200 to limit the duty cycle range, so as to apply a minimum duty cycle, for example of 70%. This prevents the duty cycle control signal generator 204 from outputting a control signal b with a duty cycle below 70%.

Figure 14:
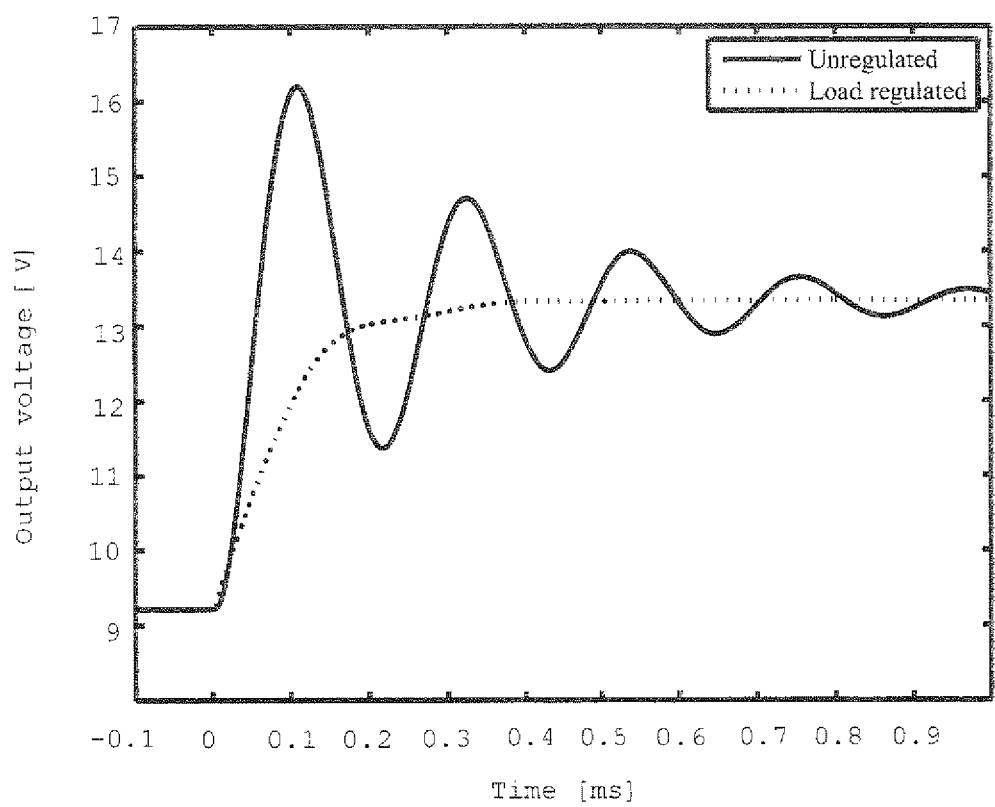
FIG. 14 shows experimental results from the test comparison, comparing the performance of the embodiment of the present invention with the known unregulated converter for the case of an input voltage step from 38 V to 55 V with a load current of 0 A but with the embodiment controlling the SMPS to have a load regulated supply with a minimum duty cycle.

The simulation of FIG. 13 (voltage rise from 38 V to 55 V with a rise time of 100 microseconds and with a load current of 0 A) was therefore repeated applying a minimum duty cycle of 70% to the load regulated converter. The results are shown in FIG. 14. As shown in FIG. 14, the dip is removed and the damping of the oscillations is improved by applying a minimum duty cycle threshold.

Figure 15:
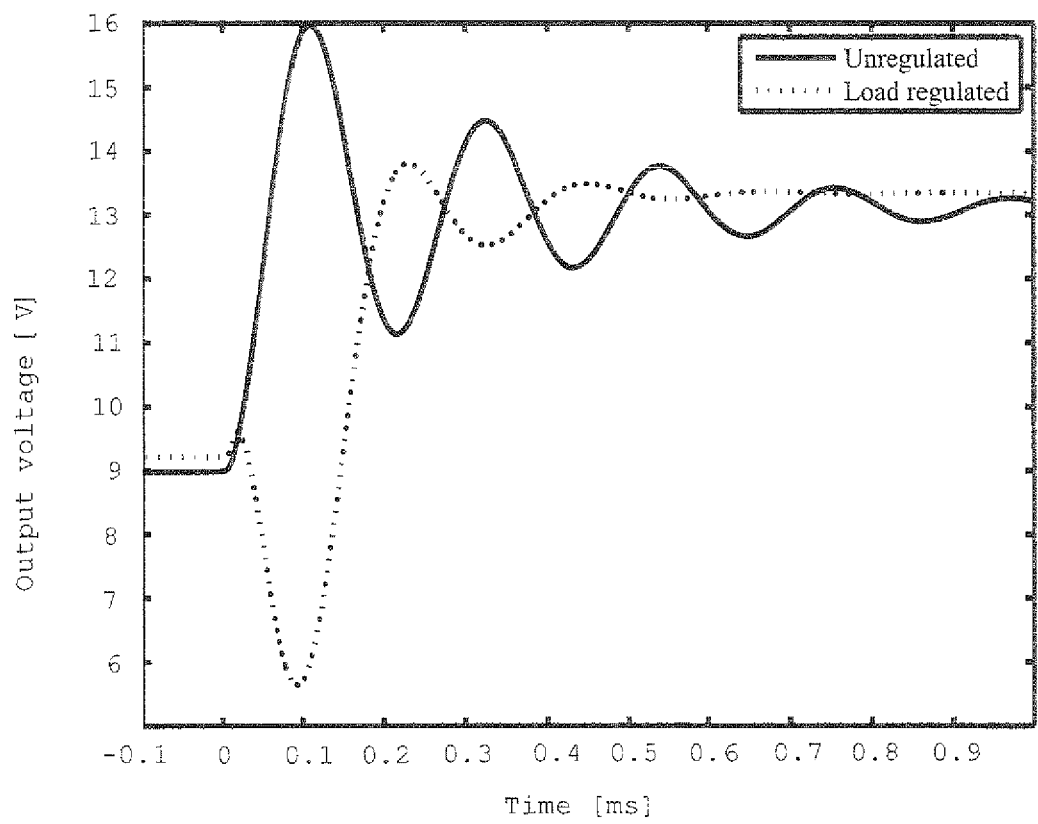
FIG. 15 shows experimental results from the test comparison, comparing the performance of the embodiment of the present invention with the known unregulated converter for the case of an input voltage step from 38 V to 55 V with a load current of 33 A.

FIG. 15 shows the results of performing the same simulation as in FIG. 13 but carried out at the full load current of 33 A instead of 0 A. This illustrates the load regulation by the steady state voltage drop in the unregulated converter since the initial and final output voltages of the unregulated converter are below the ideal levels, which are exhibited by the load regulated converter.

It will also be seen that the damping of the load regulated converter is far superior to that of the unregulated converter.

Figure 16:
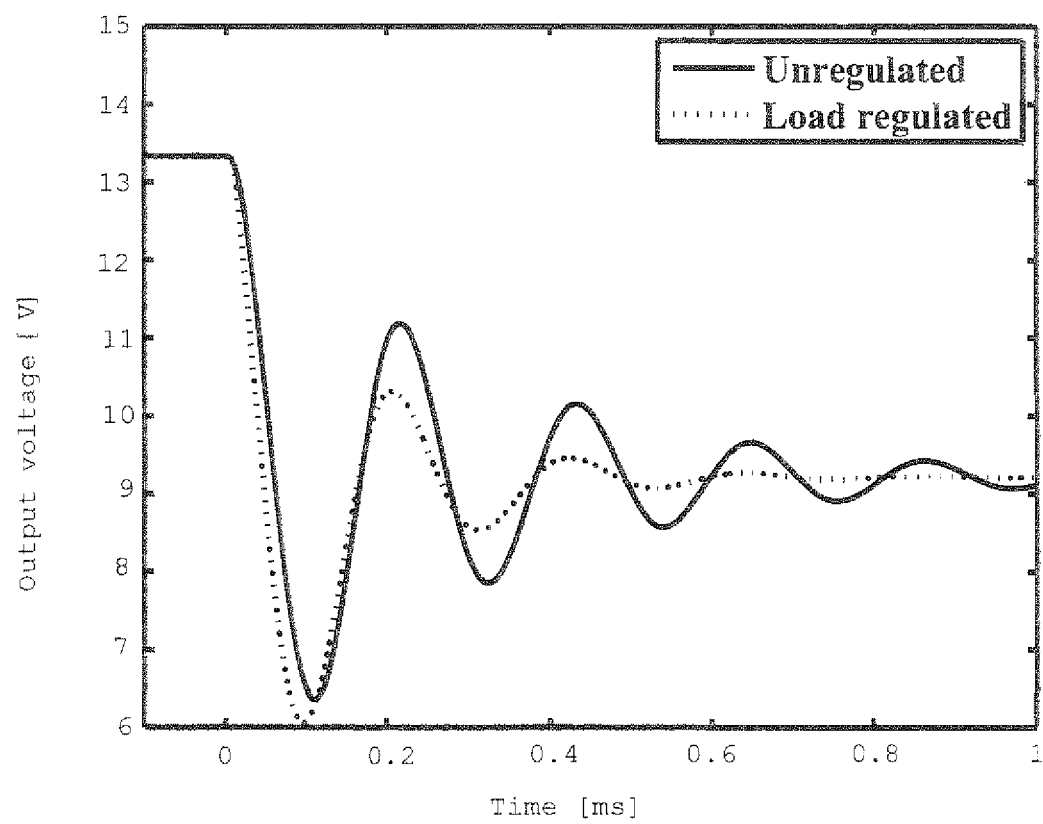
FIG. 16 shows experimental results from the test comparison comparing the performance of the embodiment of the present invention with the known unregulated converter for the case of an input voltage step from 55 V to 38 V with a load current of 0 A.

FIG. 16 shows the output voltage $V_{out}$ of the SMPS 100 during a negative input voltage step from 55 V down to 38 V with the load current of 0 A in 100 microseconds. It will be seen that the damping of the load regulated convertor is far superior to that of the unregulated convertor.

Figure 17:
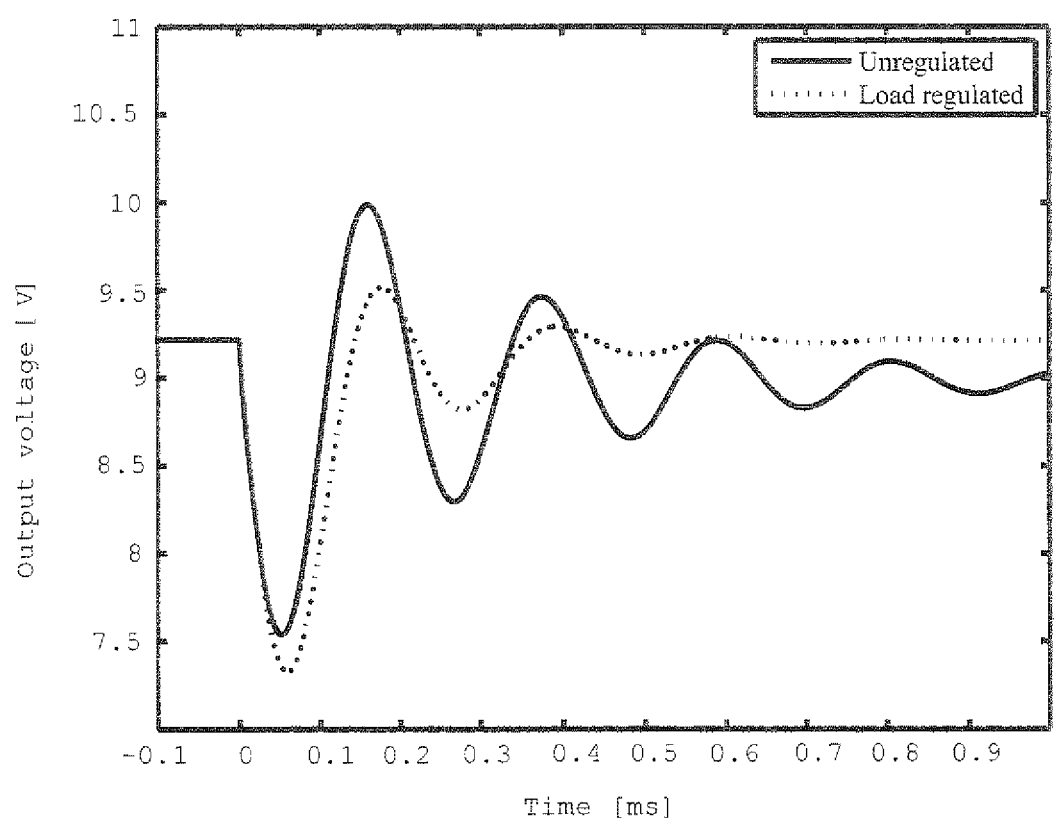
FIG. 17 shows experimental results from the test comparison comparing the performance of the embodiment of the present invention with the known unregulated converter for the case of a Positive load step from 0 A to 33 A at an input voltage of 38 V.

FIG. 17 shows the results of a positive load step from 0 A to 33 A in 1 microsecond at an input voltage of 38 V. The regulated converter has a reduced undershoot with damped oscillations, while the unregulated converter has more undershoot and much less damped oscillations. The steady state output voltage also shows the improved load regulation, i.e., the output voltage is not dependent on the load current since the final output voltage of the unregulated converter is far below the desired levels exhibited by the load regulated converter.

Figure 18:
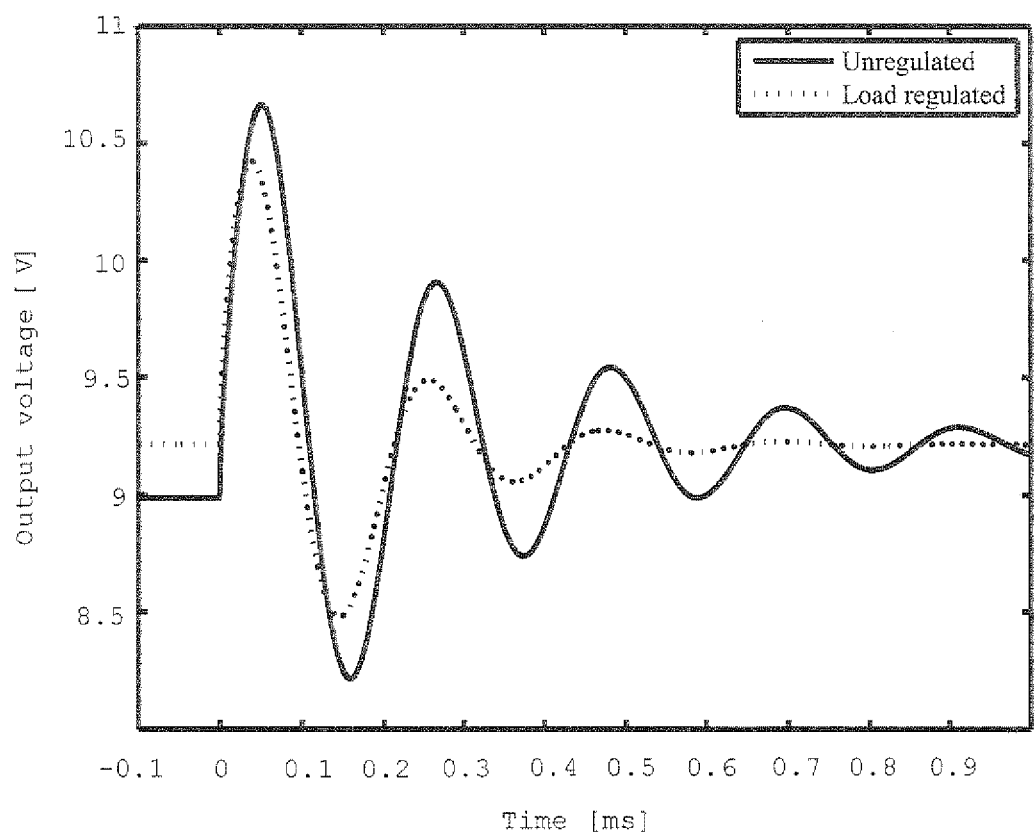
FIG. 18 shows experimental results from the test comparison, comparing the performance of the embodiment of the present invention with the known unregulated converter for the case of a negative load step from 33 A to 0 A at an input voltage of 38 V.

Similarly, FIG. 18 depicts a negative load step from 33 A to 0 A in 1 microsecond at the input voltage of 38 V. Again, the load regulated converter exhibits less overshoot with greater damping of the oscillations.

Figure 19:
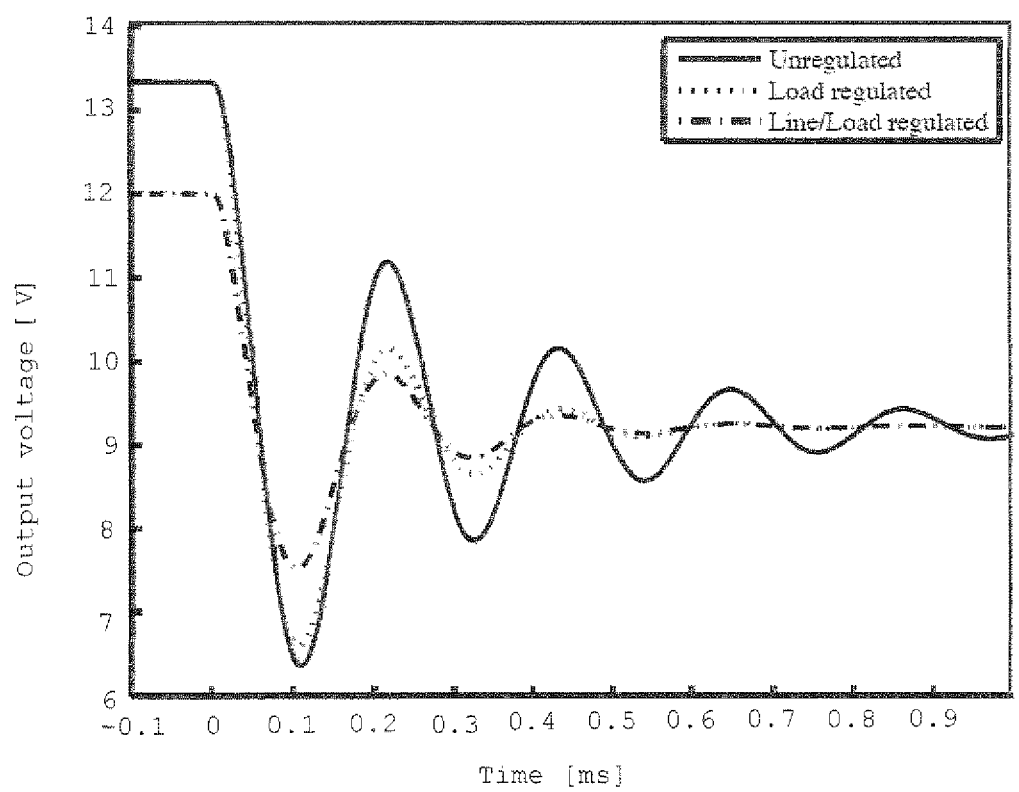
FIG. 19 shows experimental results from a test comparison comparing the performance of the embodiment of the present invention with the known converter as well as for a modification of the embodiment in which the converter operates in the second operational mode only, for the case of an input voltage step from 55 V to 38 V.

In the case where the reference voltage generator 201 can switch between operating in the Fully Regulated mode and the Regulated Ratio mode in accordance with the above-described embodiment, the results of a simulation of an input voltage step from 55 V down to 38 V are shown in FIG. 19. More specifically, FIG. 19 shows a comparison of simulation results obtained when the unregulated fixed ratio, Regulated Ratio, and the combination of Regulated Ratio and Fully Regulated (i.e. line/load regulated), modes of operation are employed. In all cases, the fall time is 100 microseconds and the load current is 0 A.

In the combined Regulated Ratio, Fully Regulated case is $V_{Rdes}$=12 V, one can observe that the scheme clamps the output voltage to $V_{Rdes}$=12 V. Moreover, the damping of the oscillations is improved compared to the other two control strategies, mainly due to a smaller output range.

[Modifications and Variants]

Many modifications and variations can be made to the embodiments, without departing from the scope of the present invention.

For example, although the control circuit 200 of the above described embodiments is a separate unit which provides control signals for controlling the duty cycle of the SMPS 100, the control unit 200 may instead be incorporated within the SMPS 100.

Furthermore, the control circuit 200 can be implemented using either analog or digital electronics, with no loss of performance. In a digital implementation of the control circuit 200, the transformer turns ratio multiplier 2011, the nominal duty cycle multiplier 2012 and the reference signal selector 2013 of the reference signal generator 201, the error signal generator 202 and/or the regulator 203 may be implemented as software components of that may form at least a part of a computer program, module, object or sequence of instructions executable by a programmable signal processing apparatus such as a microprocessor.

The reference voltage generator 201 of the above-described embodiments is configured to switch between its first and second modes of operation by the reference signal selector 2013 selecting the smaller of reference signals $V_{Rdes}$ and $V_{Rvar}$ which have been generated by a reference source and the combination of the transformer turns ratio multiplier 2011 and the nominal duty cycle multiplier 2012, respectively. However, the switch may alternatively be performed by comparing the signal indicative of the SMPS input voltage against a threshold and then generating either $V_{Rdes}$ or $V_{Rvar}$ depending on the result of this comparison.

The regulator 203 may be of any type and not specifically a PID regulator. For example, it may be a PI, PD, or lead lag compensation regulator, or another type of regulator.

The control strategy, as detailed in the above described embodiments, could be complemented with voltage feed forward compensation.

Since the SMPS 100 may be an isolated SMPS 100, then the control circuit 200 could be placed on the primary or secondary side of the transformer T1. However, the preference is for placement on the secondary side.

Depending on the placement of the control circuit 200, then one of either the output voltage $V_{out}$ of the SMPS 100 or the input voltage $V_{in}$ of the SMPS 100 must be transferred over the isolation barrier. There are many well-known techniques for achieving this, for example sampling of the voltage on the secondary side of the transformer T1 of the SMPS 100 during the on-period is a good measurement of the input voltage, including the transformer ratio n.

Further, the control circuit 200 is not limited to controlling the SMPS topology of a full-bridge, center-tapped secondary side transformer with synchronous rectification, as shown in FIG. 10. Instead, the above described embodiments of the present invention will work equally well with many topologies including push-pull, half-bridge and forward converters topologies. Equally, the above described control circuit 200 can be used with SMPSs with a single winding secondary side transformer. Additionally, it also works with SMPSs with diode rectification on the secondary side.

The inventors have found that the above described control circuit 200 of embodiments of the present invention works particularly well when implemented with active droop which enables passive current sharing or the paralleling of several identical SMPS converters.

Figure 20:
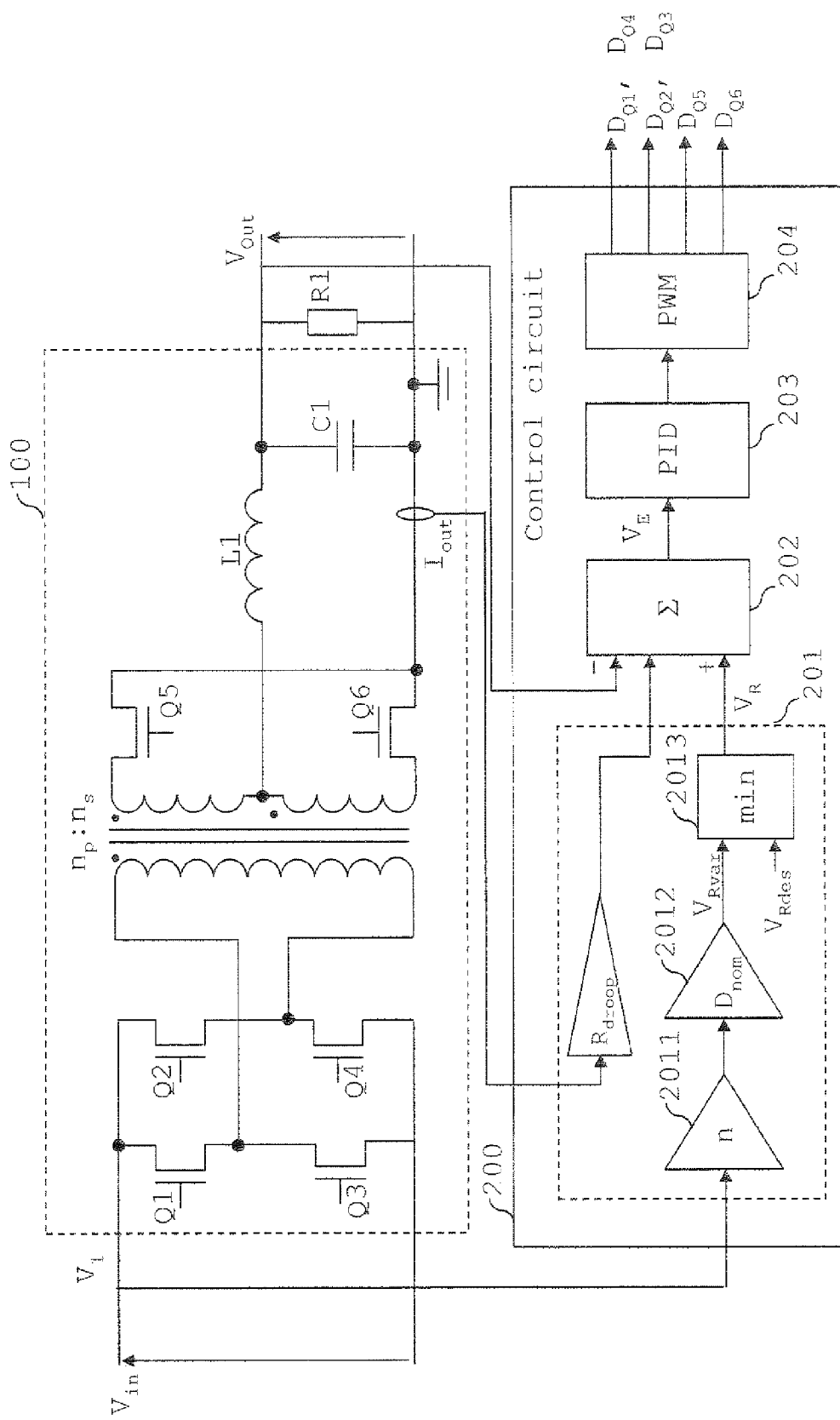
FIG. 20 shows a modification to a control circuit of the first embodiment with the inclusion of droop processing.

FIG. 20 shows an embodiment of the control circuit 200 which incorporates active droop. In this embodiment, the active droop is obtained by measuring the output current $I_{out}$ and then modifying the calculation of the error signal according to the following equation:

$$V_E = \min\{nD_{nom}V_{in}, V_{Rdes}\} - V_{out} - I_{out}R_{droop} \qquad \text{Equation 6}$$

In Equation 6 above, $n=n_s/n_p$ is the transformer turns ratio if it exists in the SMPS, $D_{nom}$ is the nominal duty cycle, $V_{in}$ is the input voltage of the SMPS 100, $V_{out}$ is the output voltage of the SMPS 100, $I_{out}$ is the output current of the SMPS 100 and $R_{droop}$ is the artificial droop resistance.

It will also be appreciated that the process steps illustrated in the flow charts in FIGS. 3 and 6 may be executed in a different order to that shown. For instance, steps S301 and S302 in FIG. 3 may be interchanged, or step S302 may be executed after step S303. Similarly, steps S501 and S502 in FIG. 6 may be interchanged, or step S502 may be executed at any point before step S505. It will also be appreciated that the ordering of multiplication steps S503 and S504 may, of course, be reversed.

The foregoing description of embodiments of the present invention has been presented for the purpose of illustration and description. It is not intended to be exhaustive or to limit the invention to the present form disclosed. Alternations, modifications and variations can be made without departing from the spirit and scope of the present invention.

The invention claimed is:

1. A control circuit operable to generate a control signal to control the duty cycle of a switched mode power supply, the control circuit comprising:

a reference voltage generator that is operative in a first mode to generate a predetermined reference signal as a reference signal and operative in a second mode to receive a signal indicative of an input voltage of the switched mode power supply and generate a variable reference signal dependent upon the input voltage and a nominal duty cycle multiplier applied to the input voltage, as the reference signal, the reference voltage generator being configured to operate in the first mode when the input voltage exceeds a threshold value, and to operate in the second mode when the input voltage is equal to or smaller than said threshold value, wherein the threshold value is determined based on a voltage of the predetermined reference signal and the nominal duty cycle;

an error signal generator operative to receive a signal indicative of an output voltage of the switched mode power supply and operative to generate an error signal based on the output voltage and on the predetermined reference signal, when in the first mode, and the variable reference signal, when in the second mode; and a duty cycle control signal generator operative to generate the control signal to control the duty cycle of the switched mode power supply in dependence upon the error signal.

2. The control circuit according to claim 1, further comprising:
a regulator operative to generate a signal defining a duty cycle ratio in dependence upon the error signal,
and wherein the duty cycle control signal generator is arranged to generate the control signal in dependence upon the signal defining the duty cycle ratio.

3. The control circuit according to claim 2, wherein the regulator is one of a proportional-integral-derivative (PID) regulator, a proportional-integral (PI) regulator, a proportional-derivative (PD) regulator and a lead lag compensation regulator.

4. The control circuit according to claim 1, wherein the reference voltage generator comprises: a transformer turns ratio multiplier operative to multiply the received signal indicative of the input voltage by a transformer turns ratio n; and a duty cycle multiplier operative to multiply the received signal indicative of the input voltage by the nominal duty cycle, wherein the transformer turns ratio multiplier and the duty cycle multiplier are arranged to multiply the signal indicative of the input voltage of the switched mode power supply by the transformer turns ratio n and the nominal duty cycle to generate the variable reference signal when the reference voltage generator operates in the second mode.

5. The control circuit according to claim 4, wherein the reference voltage generator comprises a reference signal selector operative to select the smaller of the variable reference signal and the predetermined reference signal for output as the reference signal, the threshold value being equal to a voltage indicated by the predetermined reference signal divided by the nominal duty cycle.

6. The control circuit according to claim 1, wherein the error signal generator is operative to generate the error signal by subtracting one of the output voltage of the switched mode power supply and the reference signal from the other of the output voltage of the switched mode power supply and the reference signal.

7. The control circuit according to claim 1, wherein the error signal generator is operative to receive a signal indicative of an output current of the switched mode power supply and operative to generate the error signal based on the reference signal, the output voltage and the output current.

8. The control circuit according to claim 1, wherein the duty cycle control signal generator comprises a pulse width modulator.

9. The control circuit according to claim 1, wherein the duty cycle control signal generator is arranged to generate the control signal to keep the duty cycle of the switched mode power supply above a predetermined minimum value.

10. The control circuit according to claim 1, wherein the control circuit is within the switch mode power supply.

11. A control method of generating a control signal to control the duty cycle of a switched mode power supply, the method comprising: receiving a signal indicative of an input voltage of the switched mode power supply; receiving a signal indicative of an output voltage of the switched mode power supply; generating, by a reference voltage generator, a reference signal, the generating comprising: operating in a first mode to generate a predetermined reference signal as the reference signal, when the input voltage exceeds a threshold value; operating in a second mode to generate a variable reference signal dependent upon the input voltage and a nominal duty cycle multiplier applied to the input voltage, as the reference signal, when the input voltage is equal to or smaller than said threshold value, wherein the threshold value is determined based on a voltage of the predetermined reference signal and the nominal duty cycle; generating an error signal based on the output voltage and on the predetermined reference signal, when in the first mode, and the variable reference signal, when in the second mode; and generating the control signal to control the duty cycle of the switched mode power supply in dependence upon the error signal.

12. The control method according to claim 11, wherein,
the method further comprises regulating the error signal to generate a signal defining a duty cycle ratio; and
the control signal is generated in dependence upon the signal defining the duty cycle ratio.

13. The control method according to claim 12, wherein the error signal is regulated using one of a proportional-integral-derivative (PID) regulator, a proportional-integral (PI) regulator, a proportional-derivative (PD) regulator and a lead lag compensation regulator.

14. The control method according to claim 11, wherein the reference voltage generator generates the variable reference signal in the second mode by multiplying the signal indicative of the input voltage of the switched mode power supply by a transformer turns ratio n and by the nominal duty cycle.

15. The control method according to claim 11, wherein the reference voltage generator selects the smaller of the variable reference signal and the predetermined reference signal for output as the reference signal, the threshold value being equal to a voltage indicated by the predetermined reference signal divided by a multiple of the nominal duty cycle.

16. The control method according to claim 11, wherein the error signal is generated by subtracting one of the output voltage of the switched mode power supply and the reference signal from the other of the output voltage of the switched mode power supply and the reference signal.

17. The control method according to claim 11, wherein:
the method further comprises receiving a signal indicative of an output current of the switched mode power supply; and
the error signal is generated based on the reference signal, the output voltage and the output current.

18. The control method according to claim 11, wherein the control signal is generated by generating a pulse width modulated signal in dependence upon the error signal.

19. The control method according to claim 11, wherein the control signal is generated to keep the duty cycle of the switched mode power supply above a predetermined minimum value.

* * * * *